United States Patent
Inayoshi et al.

(10) Patent No.: US 8,594,893 B2
(45) Date of Patent: Nov. 26, 2013

(54) SEAT LOAD DETERMINING APPARATUS (75) Inventors: Muneto Inayoshi, Nagoya (JP);
Hiroyuki Fujii, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 277 days.

(21) Appl. No.: 12/813,583

(22) Filed: Jun. 11, 2010

(65) Prior Publication Data

US 2011/0010056 A1    Jan. 13, 2011

(30) Foreign Application Priority Data

Jul. 8, 2009   (JP) .................................. 2009-161867

(51) Int. Cl.
*G06F 19/00* (2011.01)

(52) U.S. Cl.
USPC .......................................................... 701/45

(58) Field of Classification Search
USPC .......................................................... 701/45
See application file for complete search history.

(56) References Cited

U.S. PATENT DOCUMENTS

| | | | |
|---|---|---|---|
| 6,158,768 A * | 12/2000 | Steffens et al. | ............... 280/735 |
| 6,748,814 B2 | 6/2004 | Ishida et al. | |
| 6,786,104 B1 | 9/2004 | Aoki | |
| 8,296,099 B2 | 10/2012 | Ito et al. | |
| 8,433,476 B2 | 4/2013 | Inayoshi et al. | |
| 8,445,792 B2 | 5/2013 | Ito et al. | |
| 8,467,931 B2 | 6/2013 | Inayoshi et al. | |
| 8,504,235 B2 | 8/2013 | Inayoshi et al. | |
| 2002/0003344 A1 * | 1/2002 | Maeda | ........................ 280/733 |
| 2002/0038947 A1 * | 4/2002 | Baba et al. | .................... 280/735 |

FOREIGN PATENT DOCUMENTS

| | | |
|---|---|---|
| JP | 2001-150997 A | 6/2001 |
| JP | 3904913 B2 | 4/2007 |

* cited by examiner

*Primary Examiner* — Thomas Tarcza
*Assistant Examiner* — Maceeh Anwari
(74) *Attorney, Agent, or Firm* — Buchanan Ingersoll & Rooney PC (57) ABSTRACT

A seat load determining apparatus, which includes a load sensor provided at least one rear support portion which support a seat and detecting a load applied to the rear support portion, a load detection portion detecting a part of a weight of a load applying body provided at the seat and outputting a detected load value, a vehicle start detection sensor detecting that a vehicle starts moving, and a determining portion determining that the load applying body corresponds to an adult when the load detection portion detects the detected load value to be greater than a first determination value within a predetermined time, the determining portion determining that the load applying body corresponds to a child when the load detection portion detects the detected load value that is smaller than the first determination value and greater than a second determination value which is smaller than the first determination value.

16 Claims, 5 Drawing Sheets

SEAT LOAD DETERMINING APPARATUS

CROSS REFERENCE TO RELATED APPLICATIONS

This application is based on and claims priority under 35 U.S.C. §119 to Japanese Patent Application 2009-161867, filed on Jul. 8, 2009, the entire content of which is incorporated herein by reference.

TECHNICAL FIELD

This disclosure relates to a seat load determining apparatus which determines a weight of a load applying body such as that of an occupant that is seated in a vehicle seat.

BACKGROUND DISCUSSION

In order to enhance performances of various safety devices, for example, airbags and seatbelts mounted to a vehicle, operations of the safety devices are controlled in accordance with a weight of an occupant that is seated in a seat according to known apparatuses. For example, when the occupant is seated in the seat without wearing a seatbelt, an alarm indicates that the seatbelt is unbuckled. Further, the law stipulates that a passenger-side airbag is to be deployed at a vehicle collision when an adult is seated in the passenger seat. The law further stipulates that a deployment of an airbag should be prohibited in a case where a child safety seat is fixed to the passenger seat facing backward so that an infant or a child and a driver can see each other because an impact by the deployment of the airbag causes an adverse effects. Under the law, a weight of a smaller female adult is applied as a criterion for determining whether an occupant is an adult. The law also stipulates a criterion for determining whether an occupant is an infant or child. Thus, detecting a weight of an occupant accurately to obtain a correct determination of an occupancy state, or types of occupant is important to ensure a safety of the occupant.

A known load detecting structure for a vehicle seat, which measures a weight of an occupant, that is, a load applied to support portions of a seat, is disclosed in JP3904913B (Patent reference 1). According to the known load detecting structure for the vehicle seat, a load detection means which includes a strain gauge is provided between each of seat-side lower rails serving as the support portion of the seat and each of floor-side leg members so that the loads detected by the four load detection means are added to obtain the weight of the occupant. Known apparatuses which detect a portion of the load by a load detection means which is provided at a part of support portions are adopted because the accurate load is not necessarily measured for determining whether or not a passenger occupies a seat or whether an occupant is an adult or an infant/child. According to a known seat weight measuring apparatus disclosed in JP2001-150997A (Patent reference 2), a load sensor is provided only at a rear-center support portion among three support portions including a fore-left support portion, a fore-right support portion, and the rear-center support portion. Accordingly, the number of load sensors is reduced to reduce costs of parts and costs for assembling and wiring.

With constructions of apparatuses such as Patent reference 2 for detecting a part of load by a load detection means provided at a part of support portions, a distribution ratio of the load applied to the part of the support portions changes in response to changes of postures of the occupant and changes in positions of the occupant, and a detected load value varies. In order to reduce the influence of the changes of postures of the occupant and the changes in positions of the occupant to the load value to be detected, Patent reference 2 discloses a positional sensor which detects a position of the occupant on the seat.

The known apparatus disclosed in Patent reference 2, which detects a part of the load applied to the support portions is favorable in terms of enabling to reduce the cost. However, according to the construction of the apparatus disclosed in Patent reference 2, a precision of the determination of types of occupant declines compared to the apparatus disclosed in Patent reference 1, which detects all of the loads applied to the support portions. For example, with the load sensor provided at the rear portion of the seat, a detected load value declines when an occupant is seated at a front portion of the seat or when an occupant is seated in the seat leaning forward without leaning against a seatback. In those circumstances, even if the occupant is an adult, the apparatus may determine that the occupant is an infant/child. In a case where the additional positional sensor is provided similar to Patent reference 2 in order to enhance the precision of the determination of types of occupants, the manufacturing cost increases with each positional sensor, thus the advantages of reducing the load sensor are ineffective.

Further, an angle of inclination of the vehicle fluctuates the detected load value applied to the support portions. For example, when the vehicle travels downhill, the detected load value is assumed to be smaller compared to when the vehicle travels on a flat road because the load sensor provided at the rear portion of the seat receives less ratio of the weight of the load applying body seated on the seat when the vehicle travels the downhill than when the vehicle travels on the flat road. In a case where the aforementioned causes such as positions and postures of the occupant are added, accurate determination of types of the occupant becomes further difficult.

A need thus exists for a seat load determining apparatus which is not susceptible to the drawback mentioned above.

SUMMARY

In light of the foregoing, the disclosure provides a seat load determining apparatus, which includes a load sensor provided at least one rear support portion among plural support portions which support a seat including a seat back at a rear portion thereof and detecting a load applied to the rear support portion, a load detection portion detecting a part of a weight of a load applying body selectively provided at the seat based on an output of the load sensor and outputting a detected load value, a vehicle start detection sensor detecting that a vehicle starts moving, and a determining portion determining that the load applying body corresponds to that of an adult seated in the seat when the load detection portion detects the detected load value to be greater than a first determination value within a predetermined time after the vehicle start detection sensor detects the start motion of the vehicle, the determining portion determining that the load applying body corresponds to that of a child seated in a child safety seat which is fixed to the seat when the load detection portion detects the detected load value that is smaller than the first determination value and greater than a second determination value which is smaller than the first determination value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
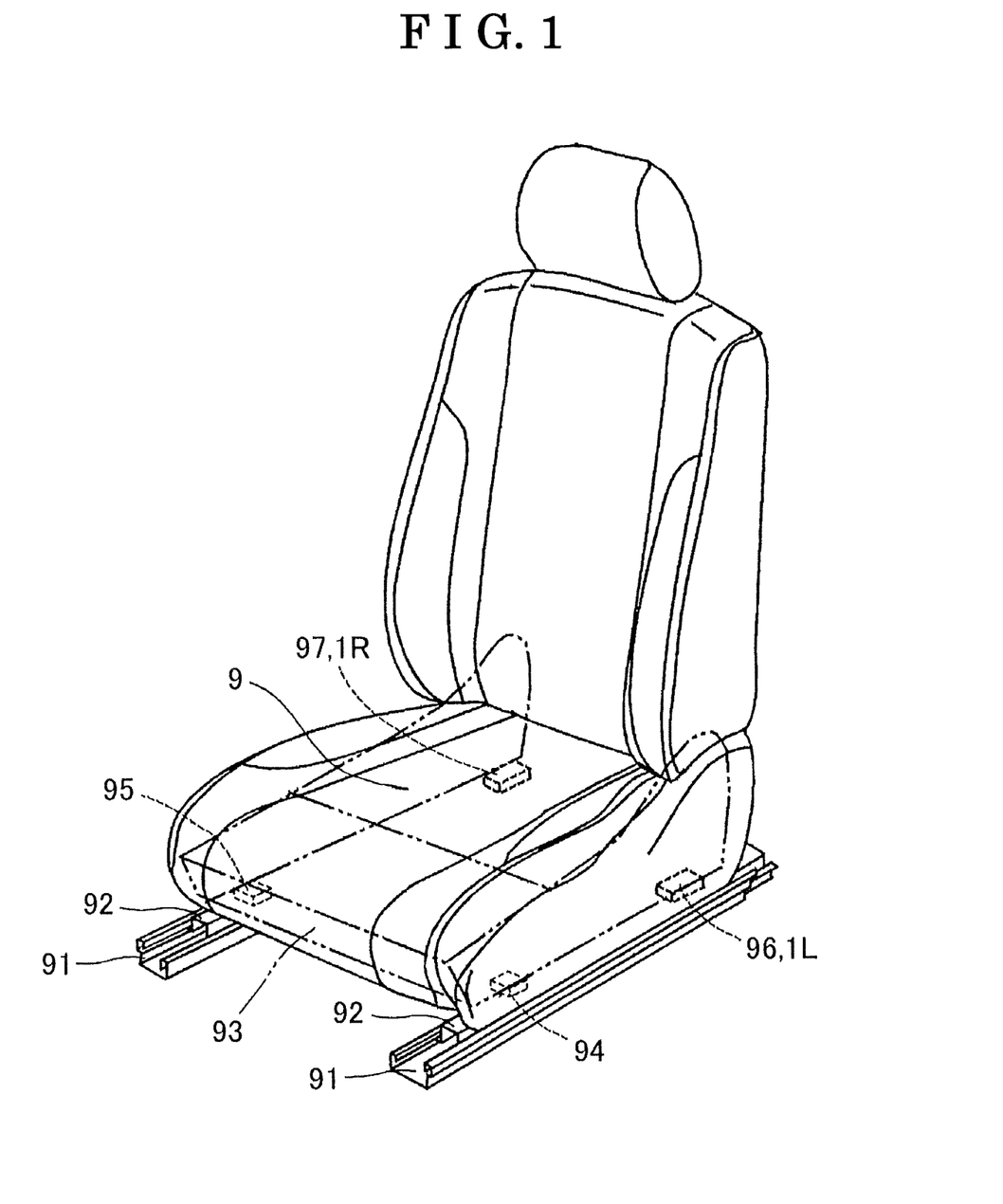
FIG. 1 shows a passenger seat which includes a seat load determining apparatus according to a first embodiment of this disclosure.

Embodiments of seat load determining apparatus will be explained with reference to illustrations of drawing figures as follows. A first embodiment will be explained referring to FIGS. 1 to 4. As shown in FIG. 1, a passenger seat 9 which is provided with a seat load determining apparatus 1 is configured to be movable in a forward-backward direction by means of a slide mechanism including a lower rail 91 and an upper rail 92 serving as a pair and extending in a forward-backward direction of a vehicle. A bottom portion frame 93 which is covered with a cushion of the seat 9 is supported by the upper rails 92 via support portions 94, 95, 96, 97. A bottom surface of the bottom portion frame 93 is supported at four corner portions via the support portions 94, 95, 96, 97. The support portions 94 and 95, which are positioned at front portions of the seat and separated from each other in a vehicle width direction, simply support the load. A rear-left load sensor 1L and a rear-right load sensor 1R which detect applied loads are provided at the support portion 96 and the support portion 97, respectively, which are positioned at rear portions of the seat and separated from each other in the vehicle width direction.

Figure 2:
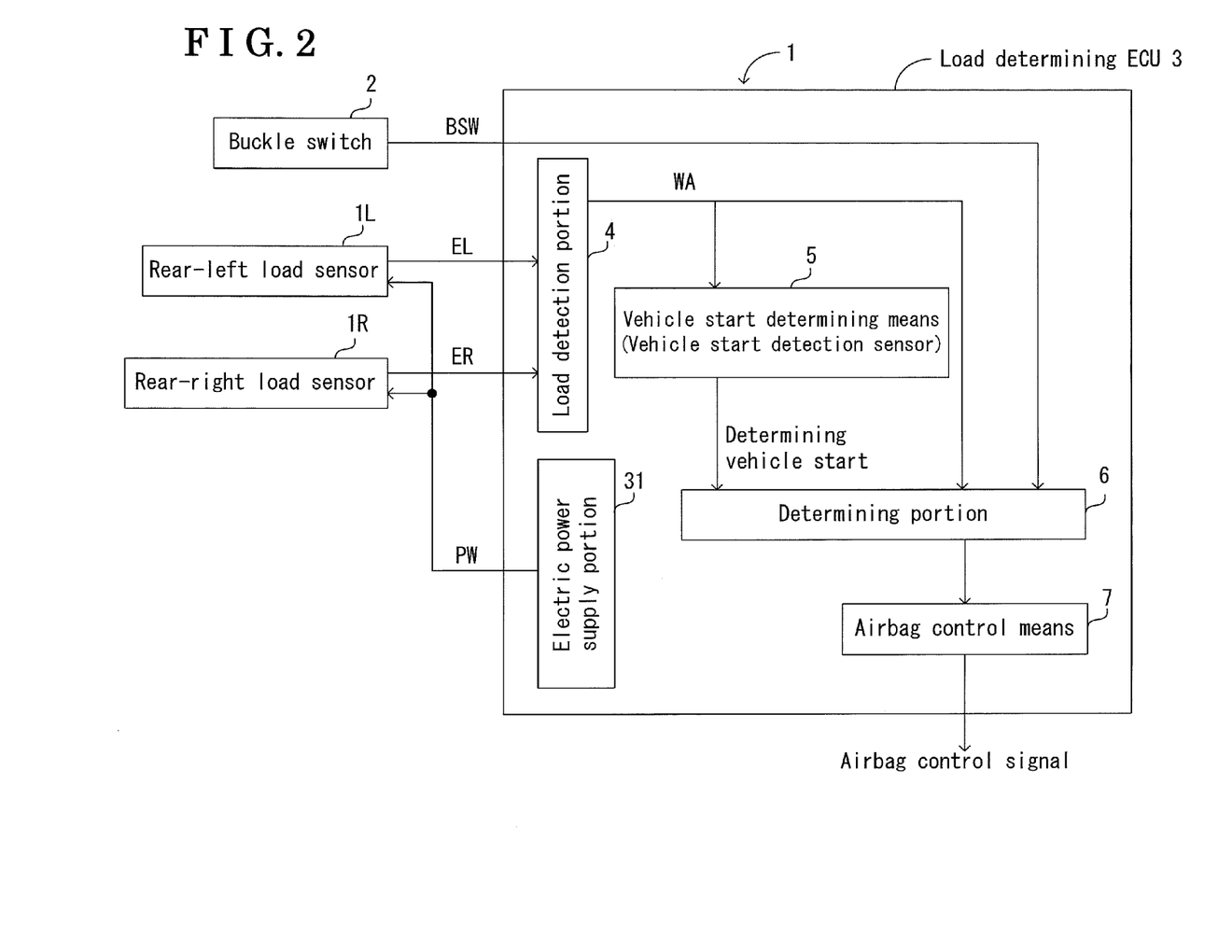
FIG. 2 is a block diagram of the seat load determining apparatus according to the first embodiment of this disclosure.

The seat load determining apparatus 1 shown in FIG. 2 includes a vehicle start determining means 5 which determines a start of a vehicle. The vehicle start determining means 5 serves as a vehicle start detection sensor which detects a part of a weight of a load applying body which is on the seat 9 during a predetermined period after the vehicle starts and while the vehicle stops for determining whether the load applying body corresponds to an adult passenger or an infant/child passenger. Here, the load applying body may correspond to an adult passenger, an infant/child passenger, an infant/child seated in a child safety seat, or the like. As shown in FIG. 2, the seat load determining apparatus 1 includes the rear-left load sensor 1L, the rear-right load sensor 1R, a buckle switch 2, and a load determining ECU 3.

The rear-left load sensor 1L and the rear-right load sensor 1R are strain gauge sensors, and each electric output EL, ER is outputted to a load detection portion 4 of the load determining ECU 3. Power PW is supplied from an electric power supply portion 31 of the load determining ECU 3 to the rear-left load sensor 1L and the rear-right load sensor 1R when requested. Further, a buckle switch 2 which detects whether an occupant wears a seatbelt is provided at a buckle provided at the seat 9 for buckling up the seatbelt. Buckle information BSW is outputted from the buckle switch 2 to the load determining ECU 3. The load determining ECU 3 is an electronic control apparatus which is operated by software and which includes a calculation portion, a memory portion, an input portion, and output portion. The load detection portion 4, the vehicle start determining means 5, a determining portion 6, and an airbag control means 7 are provided in the load determining ECU 3 mainly with software.

The load detection portion 4 provided at an input portion of the load determining ECU 3 includes an analog to digital converter (ADC). At the load detection portion 4, the electric output EL and the electric output ER of the rear-left load sensor 1L and the rear-right load sensor 1R are added and a detected load value WA (N or kgw) is obtained by a predetermined conversion equation to be outputted. Further, the load detection portion 4 is activated at a predetermined sampling cycle and performs a moving average in which the most recent plural raw data is equalized to output the detected load value WA.

Here, zero point calibration of the load detection portion 4 and the detected load valve WA is pre-performed. When performing the zero point calibration, a part of weight of the seat 9 is applied to the rear-left load sensor 1L and the rear-right load sensor 1R in a reference state where the vehicle is not inclined and any load applying body is not on the seat 9. In those circumstances, a level of the electric outputs EL, ER are adjusted to be zero. Alternatively, constants of conversion equation of the load detection portion 4 may be determined so that the detected load value WA is assumed to be zero while the electric outputs EL, ER are not assumed to be zero. By performing the zero point calibration, the detected load value WA assumes to correspond only to a weight of the load applying body excluding the weight of the seat 9 itself.

Consecutive to the zero point calibration, an adult determination value W1 when vehicle starts moving (i.e., the value W1 determining that an adult occupies the seat at a start of vehicle), a child determination value W2 when vehicle starts moving (i.e., the value W2 determining that an infant/child occupies the seat at a start of vehicle), an adult determination value W3 when the vehicle is not in motion (i.e., the value W3 determining that an adult occupies the seat when the vehicle is not in motion), and a child determination value W4 when a vehicle is not in motion (i.e., the value W4 determining that an infant/child occupies the seat when the vehicle is not moving), which correspond to a first determination value, a second determination value, a third determination value, and a fourth determination value, respectively, are predetermined to be stored in the memory portion of the load determining ECU. First, the adult determination value W3 when the vehicle is not in motion is determined based on a detected load value WA outputted from the load detection portion 4 when an adult is seated in the seat 9 in a normal posture when the vehicle is not moving. The detected load value WA is less than an actual weight of an adult because the detected load value WA corresponds to a part of a weight the load applying body. The adult determination value W3 when the vehicle is not in motion is determined considering distribution of weight of the adult so that small adult is correctly determined as an adult. Similarly, the child determination value W4 when the vehicle is not in motion is determined based on a detected load value WA outputted from the load detection portion 4 when an infant/child is seated in the child safety seat which is fixed to the seat 9 when the vehicle is not moving. The child determination value W4 when the vehicle is not in motion is determined to be smaller than the adult determination value W3 when the vehicle is not in motion. Further, the adult determination value W1 when the vehicle starts moving and the child determination value W2 when the vehicle starts moving which are greater than when the vehicle is at a stand still are determined considering an increment of a load by an acceleration when the vehicle starts moving, or when the vehicle is in motion (i.e., W1>W2, W1>W3, W2>W4).

The determination values W1, W2, W3, W4 may be obtained based on an experiment by an actual measurement, or may be obtained based on a calculation by a sharing rate of a load at a front portion and a rear portion of the seat 9 and variables such as an acceleration generated when the vehicle starts moving, or the like. For enhancing precisions of the determination values W1, W2, W3, W4, both of the experimental approach and the calculation may be combined.

The vehicle start determining means 5 corresponding to a vehicle start detection sensor determines that the vehicle starts moving, or the vehicle is in motion based on the detected load value WA outputted from the load detection portion 4. More particularly, the vehicle start determining means 5 determines that the vehicle started moving when a vehicle start determining condition that the detected load value WA increases by an increasing rate greater than a predetermined increasing rate for a predetermined time period at a level equal to or greater than a predetermined level is satisfied. When the start of the vehicle is determined, the vehicle start determining means 5 outputs the determination of the vehicle start to the determining portion 6.

The determining portion 6 determines whether the load applying body corresponds to an adult or an infant/child by comparing the detected load value WA outputted from the load detection portion 4 with each of the determination values W1, W2, W3, W4. In those circumstances, "adult" is defined as an adult that has a weight equal to or greater than a small adult female, and "child" is defined as an infant/child that is seated in the child safety seat which is fixed to the seatbelt. The determining portion 6 distinguishes whether the vehicle is started or is at a stand still based on whether or not the vehicle start determination information is outputted from the vehicle start determining means 5 to use separately and appropriately the determination values W3, W4 during the vehicle is at the stand still and the determination values W1, W2 when the vehicle starts moving, or when the vehicle is in motion. The determining portion 6 outputs determination results of "adult" or "child" to the airbag control means 7.

The airbag control means 7 outputs an airbag control signal upon receiving the determination result from the determining portion 6, allows a deployment of the airbag at a vehicle collision in a case where the determination result is "adult", and prohibits a deployment of the airbag at a vehicle collision in a case where the determination result is "child"

Figure 3:
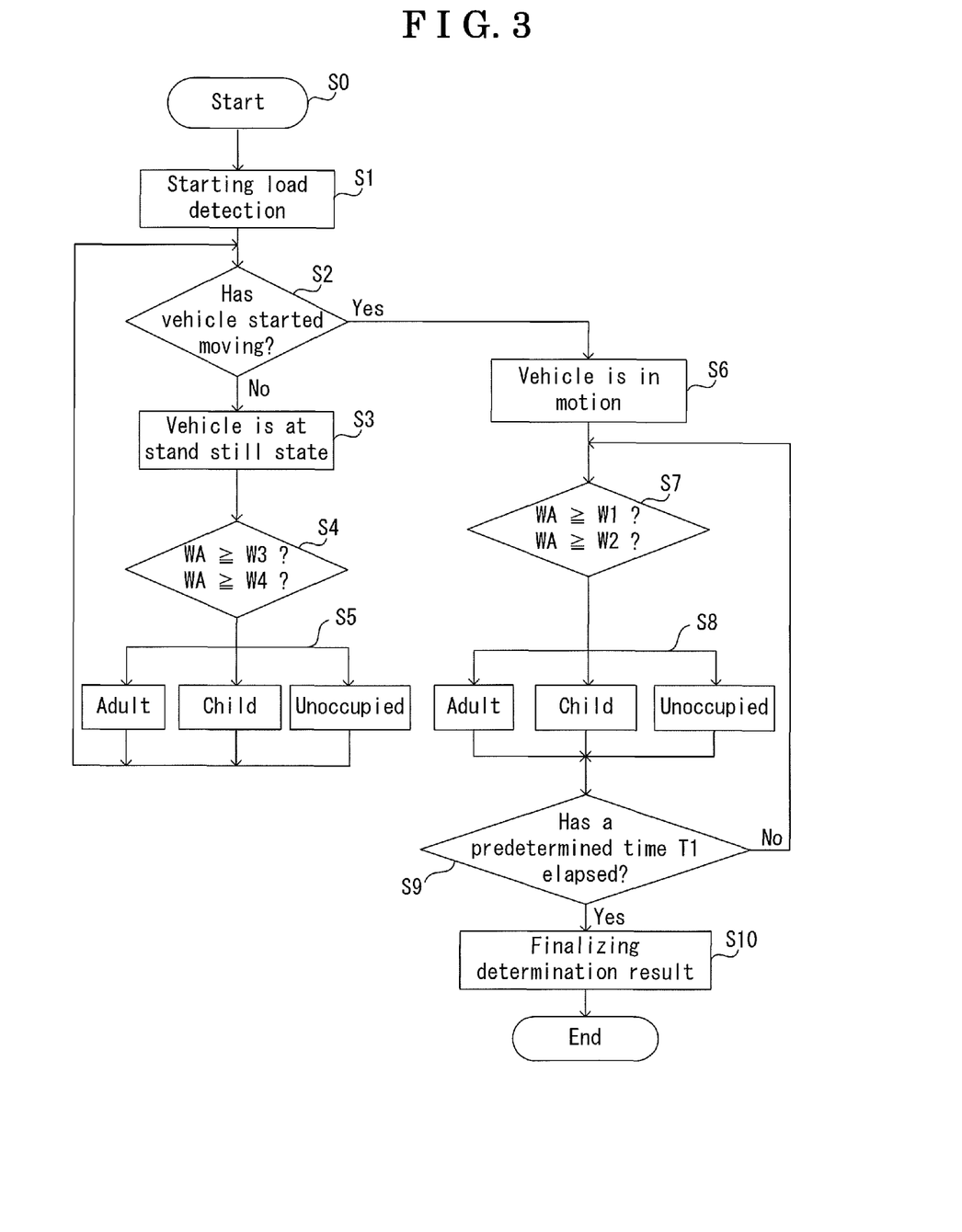
FIG. 3 shows a flow chart for determining a level of a load applied to the seat when a vehicle starts moving according to the construction disclosed in FIG. 2.

Operations, calculations, and transactions of the seat load determining apparatus 1 will be explained with reference to FIG. 3. FIG. 3 shows a flow chart for a seat load determination when the vehicle starts moving, or when the vehicle is in motion. According to the seat load determination flow, first, an operation at the load determining ECU 3 is initiated when either an ignition switch IG is assumed to be ON or the buckle switch 2 is assumed to be ON by buckling up the seatbelt to output the buckle information at Step S0. Next, at Step S1, the rear-left load sensor 1L and the rear-right load sensor 1R which are supplied with the power PW from the electric power supply portion 31 output the electric outputs EL, ER, and the load detection portion 4 samples the electric outputs EL, ER by the predetermined sampling cycle to add each other, and outputs the detected load value WA by converting the added values using the conversion equation.

At Step S2, the vehicle start determining means 5 examines temporal changes in the detected load value WA. In a case where the aforementioned vehicle start determining conditions are not satisfied, the vehicle start determining means 5 determines that the vehicle is at standstill at Step S3, and a transaction is advanced to Step S4. Further, when the aforementioned vehicle start determining conditions are satisfied, the vehicle start determining means 5 determines that the vehicle starts moving, or the vehicle is in motion, and a transaction is advanced to Step S7.

At Step S4, the determining portion 6 compares the detected load value WA with the adult determination value W3 when the vehicle is not in motion and the child determination value W4 when the vehicle is not in motion. At Step S5, when the detected load value WA is equal to or greater than the adult determination value W3 when the vehicle is not in motion, the load applying body which occupies the seat 9 is determined to be "adult." When the detected load value WA is less than the adult determination value W3 when the vehicle is not in motion and is equal to or greater than the child determination value W4 when the vehicle is not in motion, the load applying body which occupies the seat 9 is determined to be "child." Further, at Step S5, when the detected load value WA is less than the child determination value W4 when the vehicle is not in motion, it is determined that the seat 9 is unoccupied. After determining seat occupancy states, the transaction returns to Step S2 to repeat Steps S2 to S5 until the vehicle starts moving. In a case where the determination result is changed because of an increase of the detected load value WA while repeating transactions of Steps S2 to S5, the determination result is renewed. Namely, the determination result may be changed from "unoccupied" to "child" or "adult," and from "child" to "adult." On the other hand, even if the detected load value WA decreases momentarily, the previous determination result is maintained.

When the vehicle starts moving, at Step S7, the determining portion 6 compares the detected load value WA with the adult determination value W1 when the vehicle starts moving and the child determination value W2 when the vehicle starts moving. At Step S8, when the detected load value WA is equal to or greater than the adult determination value W1 when the vehicle starts moving, the load applying body which occupies the seat 9 is determined to be an "adult." When the detected load value WA is less than the adult determination value W1 when the vehicle starts moving and is equal to or greater than the child determination value W2 when the vehicle starts moving, the load applying body which occupies the seat 9 is determined to be a "child." Further, when the detected load value WA is less than the child determination value W2 when the vehicle starts moving, it is determined that the seat 9 is unoccupied. After determining seat occupancy states, at Step S9, whether a predetermined period TA has elapsed after determining that the vehicle starts moving is examined. In a case where the predetermined period TA has not elapsed after determining that the vehicle starts moving, the transaction returns to Step S7 to repeat the transactions for determinations. In a case where the determination result is changed because of an increase of the detected load value WA while repeating transactions of Steps S7 to S9, the determination result is renewed. On the other hand, even if the detected load value WA decreases momentarily, the previous determination result is maintained.

In a case where the predetermined period TA has not elapsed after determining that the vehicle starts moving at Step S9, the determination result is finalized at Step S10 to cease the operation.

Irrespective of the vehicle states, whether the vehicle is stopped or the vehicle moves, the determination results of "adult" and "child" are outputted to the airbag control means 7 successively. The airbag control means 7 outputs an airbag control signal to control the airbag upon receiving the determination results.

Figure 4:
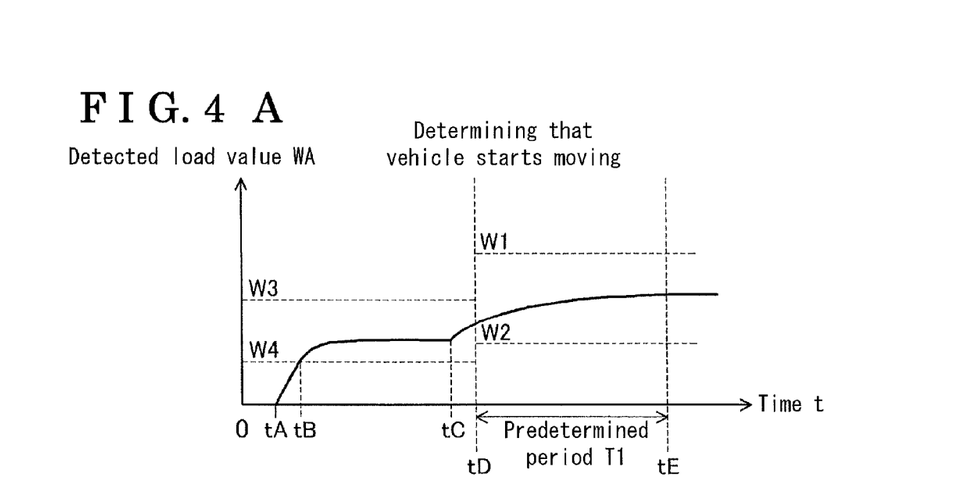
FIG. 4A is a graph showing temporal characteristics of a detected load value when an infant/child is seated in a child safety seat.
FIG. 4B is a graph showing temporal characteristics of a pre-detected load value when an adult is seated in a normal posture.
FIG. 4C is a graph showing temporal characteristics of a detected load value when an adult is seated leaning forward or seated at a front portion of the seat.

Referring to FIG. 4, operations and advantages of the seat load determining apparatus 1 according to the first embodiment will be explained. Lateral axis shows time t and vertical axis indicates detected load value WA in FIG. 4. Further, levels of the adult determination value W3 when the vehicle is not in motion, the child determination value W4 when the vehicle is not in motion, the adult determination value W1 when the vehicle starts moving, and the child determination value W2 when the vehicle starts moving are shown in FIG. 4.

Referring to FIG. 4A, a case where an infant/child is seated in the child safety seat will be explained as follows. First, when the ignition switch IG is turned ON in a state where the vehicle is stopped at time 0, the adult determination value W3 when the vehicle is not in motion and the child determination value W4 when the vehicle is not in motion are set. Then, when the infant/child is placed on the child safety seat which is fixed to the seat 9 at time tA, the detected load value WA starts increasing to be greater than the child determination value W4 when the vehicle is not in motion at time tB, thus correctly determining that the load applying body corresponds to the "child." Thereafter, the detected load value WA is substantially stabilized at levels lower than the adult determination value W3 when the vehicle is not in motion and when the vehicle starts moving at time tC, the detected load value WA starts increasing again by the acceleration. In those circumstances, with a slight time lag, the vehicle start determining condition is satisfied to determine that the vehicle starts moving at time tD. Accordingly, the adult determination value W1 when the vehicle starts moving and the child determination value W2 when the vehicle starts moving are set. Thereafter, the detected load value WA changes between the adult determination value W1 when the vehicle starts moving and the child determination value W2 when the vehicle starts moving to maintain a correct determination of "child". At time tE at which a predetermined period T1 has elapsed from time tD at which that the vehicle starts moving has determined, the seat load determination flow is completed.

In a case where the buckle switch 2 is turned ON before the ignition switch IG is turned ON, because the detected load value WA is detected immediately after time tB in FIG. 4A, there is no problem in determining the occupancy states of the seat 9. Further, in a case where the infant/child is seated in (retained at) the child safety seat which is fixed to the seat 9, a large load may be generated temporarily. However, as explained above, because the moving average is applied to the detected load value WA, the temporally generated large load is not shown as a steep increment. Accordingly, the temporally generated large load when, for example, the infant/child is seated in the child safety seat which is fixed to the seat 9 does not wrongly determine the occupancy states.

Next, a case where an adult is seated in the seat 9 in a normal posture will be explained with reference to FIG. 4B. When the ignition switch IG is turned ON in a state where the vehicle is stopped at time 0, the adult determination value W3 when the vehicle is not in motion and the child determination value W4 when the vehicle is not in motion are set. Then, when an occupant starts seating in the seat 9 at time tF, the detected load value WA starts increasing to be greater than the child determination value W4 when the vehicle is not in motion at time tG. Thus, temporarily, it is determined that a "child" is seated in the seat 9, and when the detected load value WA exceeds the adult determination value W3 when the vehicle is not in motion at time tH, the determination of the seat occupancy state is renewed correctly that the "adult" is seated in the seat 9. Thereafter, the detected load value WA is substantially stabilized, and starts increasing again when the vehicle starts moving at time tJ by the acceleration. In those circumstances, the vehicle start determining conditions are satisfied after a time lag, so that that the vehicle starts moving is determined at time tK. Thus, the adult determination value W1 when the vehicle starts moving and the child determination value W2 when the vehicle starts moving are set. Thereafter, the detected load value WA changes at levels greater than the adult determination value W1 when the vehicle starts moving to maintain the correct determination of the occupancy state that the "adult" occupies the seat 9. Thereafter, the seat load determination flow is completed at time tL at which a predetermined time period T1 has elapsed from time tK at which that the vehicle starts moving is determined.

Further, a case where an adult is seated in the seat 9 at a front portion thereof or an adults is seated in the seat 9 leaning forward will be explained with reference to FIG. 4C as follows. First, when the ignition switch IG is turned ON in a state where the vehicle is not in motion at time 0, the adult determination value W3 when the vehicle is not in motion and the child determination value W4 when the vehicle is not in motion are set. When an occupant starts seating in the seat 9 at time tM, the detected load value WA starts increasing. Then, the seat occupancy state is determined that the "child" is seated in the seat 9 when the detected load value WA exceeds the child determination value W4 when the vehicle is not in motion at time tN. Because a load sharing ratio of the support portions 96, 97 provided at the rear portion of the seat 9 is small, the detected load value WA is substantially stabilized at levels lower than the adult determination value W3 when the vehicle is not in motion. Thereafter, when the vehicle starts moving at time tP, the detected load value WA is increased again by the acceleration. After slight time lag, the vehicle start conditions are satisfied to determine that the vehicle starts moving at time tQ, and thus the adult determination value W1 when the vehicle starts moving and the child determination value W2 when the vehicle starts moving are set. In those circumstances, the detected load value WA increases with an inclination steeper than the cases shown in FIGS. 4A and 4B because an actual weight of the adult is greater than the infant/child and because the load sharing ratio of the support portions 96, 97 at the rear portion of the seat increases due to changes in the seating position of the occupant (adult) and changes in the occupant's (adult's) posture to lean backward. Thereafter, when the detected load value WA exceeds the adult determination value W1 when the vehicle starts moving at time tR, the determination result of the seat occupancy state is renewed that the "adult" is seated in the seat 9. Thereafter, the seat load determination flow is completed at time tS at which the predetermined time period T1 has elapsed from time tQ at which that the vehicle starts moving was determined.

In a case where an adult, particularly, a small adult with relatively light weight, is seated in the front portion of the seat or is seated in the seat leaning forward, seat occupancy states may not be correctly determined when the vehicle is at stand still. According to the construction of the first embodiment, because the adult determination value W1 when the vehicle starts moving is set to be greater than the adult determination value W3 when the vehicle is not in motion and the determining portion 6 determines the seat occupancy state after an elapse of the predetermined time period T1 from the start of the vehicle, whether the occupant is categorized as "adult" or "child" is determined with high precision by a detection of the distinguished increase of the detected load value affected by the acceleration when the vehicle starts moving. Further, even if the seat occupancy state cannot be correctly determined during the stationary state of the vehicle, the determination of the seat occupancy state can be renewed to a correct determination result when the vehicle starts moving.

Further, because the rear-left load sensor 1L and the rear-right load sensor 1R are provided at positions corresponding to left and right portions of the seat in the vehicle width direction, the detected load value which corresponds to a half of the load (weight) of the occupant who is seated in the seat can be attained, and thus whether the occupant is categorized as "adult" or "child" is determined with high precision. Still further, because the outputs of the rear-left load sensor 1L and the rear-right load sensor 1R which are positioned at left and right sides separated from each other are added, even if the vehicle is positioned inclined in a right-left direction or the occupant is seated in the seat 9 leaning either rightward or leftward, those states of the vehicle and/or the occupant do not affect the detected load value WA. Accordingly, the detection and the determination are performed with high precision.

Further, according to the constructions of the embodiment, because the vehicle start determining means 5 is formed with the software of the load determining ECU 3, a hardware serving as the vehicle start detection sensor is not required. Thus, the seat load determining apparatus 1 is produced with lower manufacturing cost. In addition, the seat load determining apparatus 1 does not complicate a vehicle control system because it is not required to communicate (exchange the information) with other apparatuses, for example, a speed change control ECU which receives an output of a vehicle speed sensor provided at a power train.

Further, the determining portion 6 determines the seat occupancy state before the vehicle starts moving using the adult determination value W3 when the vehicle is not in motion and the child determination value W4 when the vehicle is not in motion, and the airbag control means 7 controls the airbag based on the determination results as soon as receiving the determination result of the seat occupancy state. Accordingly, even before the vehicle starts moving, except for cases where an adult passenger is seated in the seat at front portion thereof or an adult passenger is seated in the seat leaning forward, a seat occupancy state can be determined correctly and swiftly, and thus high reliability in safety is ensured. Even if correct determination is not attained before the vehicle starts moving, because the determination result of the seat occupancy state can be renewed by the determination of the seat occupancy state with high precision after the vehicle starts moving, there will not be mistakenly determined determination.

Figure 5:
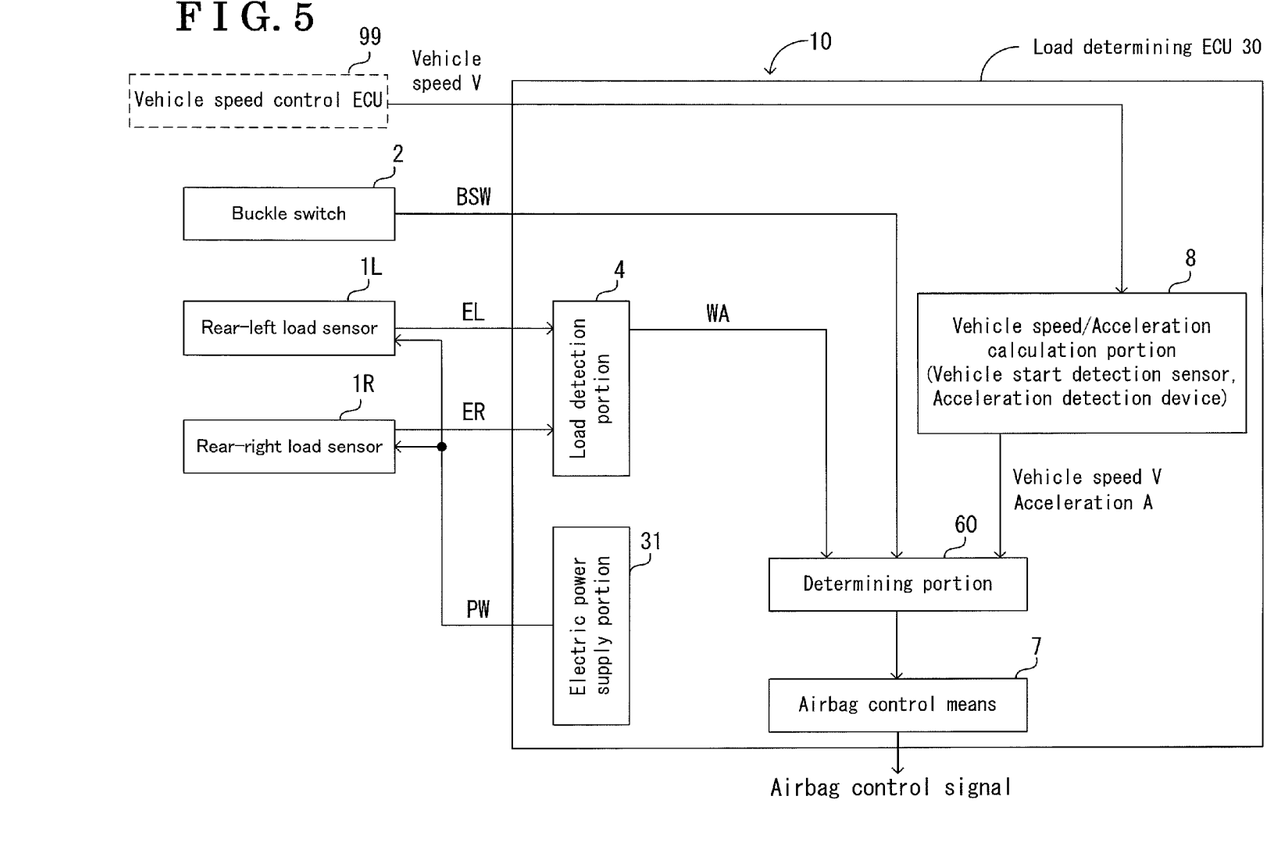
FIG. 5 is a block diagram of a seat load determining apparatus according to a second embodiment of this disclosure.

A second embodiment of the seat load determining apparatus which receives vehicle speed information from outside will be explained with reference to FIG. 5. Structures of the seat load determining apparatus according to the second embodiment different from the first embodiment will be mainly explained and explanations for common constructions will not be repeated. As shown in FIG. 5, a seat load determining apparatus 10 of the second embodiment includes a vehicle speed/acceleration calculation portion 8 (serving as a vehicle start detection sensor and an acceleration detection device) in place of the vehicle start determining means 5 of the first embodiment. The vehicle speed/acceleration calculation portion 8 is formed in a load determining ECU 30 mainly with software. As shown in FIG. 5, the vehicle speed/acceleration calculation portion 8 communicates with a vehicle speed control ECU 99 which is positioned outside to receive the information of vehicle speed V of a vehicle speed sensor provided at the power train. The vehicle speed/acceleration calculation portion 8 having a function as an acceleration detection device obtains acceleration A by differentiating the vehicle speed V and outputs the obtained acceleration A to a determining portion 60.

The determining portion 60 includes the adult determination value W3 when the vehicle is not in motion and the child determination value W4 when the vehicle is not in motion which are the same with those of the first embodiment, and an adult determination value W10 when vehicle starts moving (i.e., the value W10 determining that an adult occupies the seat at a start of the vehicle) and a child determination value W20 when vehicle starts moving (i.e., the value W20 determining that an infant/child occupies the seat at a start of the vehicle) which are variable in accordance with an increase of the acceleration A. The adult determination value W10 when vehicle starts moving and the child determination value W20 when vehicle starts moving are retained in a memory portion of the load determining ECU 30 as a correponding map having the acceleration A as a parameter or a functional equation. The determining portion 60 sets the adult determination value W3 when the vehicle is not in motion and the child determination value W4 when the vehicle is not in motion when the vehicle speed V is zero, and sets the adult determination value W10 when vehicle starts moving and the child determination value W20 when vehicle starts moving when the vehicle speed V is assumed to be other than zero based on the acceleration A.

A seat load determination flow of the seat load determining apparatus 10 according to the second embodiment is mostly the same with the seat load determination flow according to the first embodiment except the adult determination value when the vehicle starts moving and the child determination value when the vehicle starts moving. The adult determination value W1 when the vehicle starts moving and the child determination value W2 when the vehicle starts moving of the first embodiment are replaced by the adult determination value W10 when vehicle starts moving and the child determination value W20 when vehicle starts moving, and the explanations thereof are not repeated.

According to the second embodiment, advantages similar to the first embodiment will be attained in terms of enabling to determine whether the occupant is the adult or the child with high precision. Further, according to the second embodiment, by receiving the information of the vehicle speed V from outside, whether the vehicle starts moving is securely determined without delay. Further, because the variable adult determination value W10 when vehicle starts moving and the variable child determination value W20 when vehicle starts moving (the value W20 determining that an infant/child occupies a seat at a start of vehicle) are applied in accordance with changes in the acceleration A, a reliability of the determination for the seat occupancy state is further enhanced.

According to the embodiment, the determining portion 6, 60 determines whether the load applying body corresponds to that of an adult or a child (i.e., whether an adult occupies the seat or a child occupies the seat 9) by comparing the detected load value with the first determination value W1 and the second determination value W2. In those circumstances, when the vehicle starts moving, the acceleration acts on the load applying body, and increments of load acted on by the acceleration are received by the rear support portions 96, 97 and thus increasing the detected load value detected by the sensors 1L, 1R. The increments of the detected load value are approximately proportional to an actual weight of the load applying body. In a case where an occupant is seated in the seat 9 at a front portion thereof, or an occupant is seated in the seat 9 leaning forward, the detected load value further increases when the vehicle starts moving because the occupant moves backward or a position of the center of gravity of the occupant moves backward because the posture of the occupant changes from the forwardly leaning posture when the vehicle starts moving. On the other hand, in a case where a child is seated in the child safety seat which is fixed to the seat 9, an actual weight of the child is lighter than an adult and positional changes of the center of gravity of the child is smaller than that of the adult. Thus, increasing tendencies of the detected load value when the vehicle starts moving are determined on the basis of the weight of occupants, that is, the tendency when an adult occupies the seat 9 and the tendency when a child occupies the seat 9 are different, and an inclining angle of the vehicle does not affect the increasing tendencies of the detected load value when the vehicle starts moving. Accordingly, when the vehicle starts moving, an increasing rate of the detected load value when the adult occupies the seat 9 is much greater than an increasing rate of the detected load value when the child occupies the seat 9. By setting the first determination value W1 in view of the foregoing tendencies, whether the adult occupies the seat 9 or the child occupies the seat 9 can be determined with high precision.

According to the embodiment, each of the load sensors 1L, 1R is provided at two rear support portions 96, 97, respectively, which are positioned separately from each other in a vehicle width direction, and the load detection portion 4 detects a partial load of the load applying body that is seated on the seat 9 by adding the outputs from the rear support portions 96, 97.

According to the embodiment, each of the load sensors 1L, 1R is provided at two rear support portions 96, 97, respectively, which are positioned separately from each other in a vehicle width direction, and the load detection portion detects a partial load of the load applying body that is seated on the seat 9 by adding the outputs from the rear support portions 96, 97. Accordingly, when the occupant is seated in the seat 9 with a posture leaning against the seatback, the detected load value corresponding to greater proportion of increments of the load because of the acceleration and an actual weight of the occupant can be attained to determine whether the occupant is an adult or a child with a high precision. Further, because the outputs of the load sensors 1L, 1R which are positioned separately from each other are added, even if the vehicle is inclined in the right-left direction or the occupant is seated in the seat 9 leaning either leftward or rightward, the detected load value is not affected, thus the detection of the weights and the determination of types of the occupants can be attained with high precision.

According to the embodiment, the determining portion 6, 60 determines that the load applying body corresponds to the adult seated in the seat 9 when the load detection portion 4 detects the detected load value to be greater than the third determination value W3 which is smaller than the first determination value W1 in a state where the vehicle start detection sensor 5, 8 detects that the vehicle is stopped and determines that the load applying body corresponds to the child seated in the child safety seat which is fixed to the seat 9 when the load detection portion 4 detects the detected load value which is smaller than the third determination value W3 and greater than the fourth determination value W4 that is smaller than the third determination value W3.

According to the embodiment, the determining portion 6, 60 determines whether the load applying body corresponds to an adult or a child (whether an adult occupies the seat 9 or a child occupies the seat 9) by comparing the detected load value with the third determination value and the fourth determination value when the vehicle is stopped. Thus, an adult that is seated in the seat 9 in a normal posture, that is, not seated in the seat 9 at the front portion thereof or leaning forward, can be correctly determined as an adult to determine a type of occupant swiftly prior to vehicle starts moving. Further, even if proper determination is not attained before vehicle starts moving, the determination result is renewed by performing highly precise determination after the vehicle starts moving as explained above.

According to the embodiment, the vehicle start detection sensor 5 includes a vehicle start presuming portion which determines that the vehicle starts moving based on a temporal increment rate of the detected load value.

According to the embodiment, the vehicle start detection sensor 5 includes a vehicle start presuming means 5 (a vehicle start presuming portion) which determines that the vehicle starts moving based on a temporal increment rate of the detected load value. The vehicle start presuming means 5 is constructed with, for example, a software which determines that the vehicle starts moving when an increment or an increasing rate of the detected load value satisfies the predetermined vehicle start determining condition, and is formed within the load determining ECU which forms the determining portion 6. Accordingly, a hardware serving as the vehicle start detection sensor 5 is not required, thus manufacturing cost of the seat load determining apparatus is reduced. Further, according to the constructions of the embodiment, the seat load determining apparatus is not required to communicate the (exchange the information) with other apparatuses, for example, the speed change control ECU which receives an output of the vehicle speed sensor provided at the power train, which avoids a vehicle control system from being complicated.

According to the embodiment, the seat load determining apparatus 1 includes the acceleration detection device (vehicle speed/acceleration calculation portion) 8 which detects an acceleration when the vehicle starts moving. The determining portion 60 increases the first determination value W1 and the second determination value W2 in accordance with an increase of the acceleration detected by the acceleration detection device 8.

According to the embodiment, the determining portion 60 increases the first determination value W1 and the second determination value W2 in accordance with an increase of the acceleration detected by the acceleration detection device 8. Thus, by applying variable determination values to the detected load values which increases in response to an increment of the acceleration, precisions of the determination of the types of the occupant is further enhanced.

According to the embodiment, the seat 9 corresponds to a passenger seat. The seat load determining device further includes an airbag control means 7 (an airbag control portion) which allows a deployment of an airbag provided at a forward position of the passenger seat 9 when the determining portion determines that the load applying body on the passenger seat 9 corresponds to the adult at a vehicle collision, and prohibits the deployment of the airbag when the determining portion determines that the load applying body on the passenger seat corresponds to the child seated in the child safety seat at the vehicle collision.

According to the embodiment, the airbag control means 7 allows or prohibits the deployment of the airbag based on the result attained from the determining portion 6, 60. Accordingly, the deployment control of the airbag can be performed swiftly and accurately, and the reliability in terms of safety is enhanced.

According to the embodiment, the seat load determining apparatus which performs a determination of types of occupants with high precision and lower cost irrespective of a position of an occupant on a seat, a posture of the occupant when seated, and an inclination angle of a vehicle is attained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat load determining apparatus, comprising:
   a load sensor provided at at least one rear support portion among plural support portions which support a seat including a seat back at a rear portion thereof and detecting a load applied to the rear support portion;
   a load detection portion detecting a part of a weight of a load applying body selectively provided at the seat based on an output of the load sensor and outputting a detected load value;
   a vehicle start detection sensor detecting that a vehicle starts moving; and
   a determining portion configured to:
   (1) determine that the load applying body corresponds to that of an adult seated in the seat when: (a) the vehicle start detection sensor detects the start motion of the vehicle, and (b) the load detection portion detects, within a predetermined time period following the detection of the start motion of the vehicle, the detected load value to be greater than a first determination value,
   (2) determine that the load applying body corresponds to that of a child seated in a child safety seat which is fixed to the seat when: (a) the vehicle start detection sensor detects the start motion of the vehicle, and (b) the load detection portion detects, within a predetermined time period following the detection of the start motion of the vehicle, the detected load value that is smaller than the first determination value and greater than a second determination value which is smaller than the first determination value,
   (3) determine that the load applying body corresponds to the adult seated in the seat when: (a) the load detection portion detects the detected load value to be greater than a third determination value and (b) the vehicle start detection sensor detects that the vehicle is stopped, and
   (4) determine that the load applying body corresponds to the child seated in the child safety seat which is fixed to the seat when: (a) the load detection portion detects the detected load value which is smaller than the third determination value and greater than a fourth determination value that is smaller than the third determination value and (b) the vehicle start detection sensor detects that the vehicle is stopped;
   wherein the first determination value is bigger than the third determination value, the second determination value is bigger than the fourth determination value; and
   wherein the first determination value and the second determination value are determined considering an increment of a load by an acceleration when the vehicle starts moving.

2. The seat load determining apparatus according to claim 1, wherein each of the load sensors is provided at two rear support portions, respectively, which are positioned separately from each other in a vehicle width direction; and the load detection portion detects a partial load of the load applying body that is seated on the seat by adding the outputs from said two rear support portions.

3. The seat load determining apparatus according to claim 2, wherein the determining portion determines that the load applying body corresponds to the adult seated in the seat when the load detection portion detects the detected load value to be greater than a third determination value which is smaller than the first determination value in a state where the vehicle start detection sensor detects that the vehicle is stopped and determines that the load applying body corresponds to the child seated in the child safety seat which is fixed to the seat when the load detection portion detects the detected load value which is smaller than the third determination value and greater than a fourth determination value that is smaller than the third determination value.

4. The seat load determining apparatus according to claim 3, wherein the vehicle start detection sensor includes a vehicle start presuming portion which determines that the vehicle starts moving based on a temporal increment rate of the detected load value.

5. The seat load determining apparatus according to claim 3, further comprising:
   an acceleration detection device which detects an acceleration when the vehicle starts moving; and wherein the determining portion increases the first determination value and the second determination value in accordance with an increase of the acceleration detected by the acceleration detection device.

6. The seat load determining apparatus according to claim 3, wherein the seat corresponds to a passenger seat; further comprises an airbag control portion which allows a deployment of an airbag provided at a forward position of the passenger seat when the determining portion determines that the load applying body on the passenger seat corresponds to the adult at a vehicle collision, and prohibits the deployment of the airbag when the determining portion determines that the load applying body on the passenger seat corresponds to the child seated in the child safety seat at the vehicle collision.

7. The seat load determining apparatus according to claim 2, wherein the vehicle start detection sensor includes a vehicle start presuming portion which determines that the vehicle starts moving based on a temporal increment rate of the detected load value.

8. The seat load determining apparatus according to claim 2, further comprising:
   an acceleration detection device which detects an acceleration when the vehicle starts moving; and wherein the determining portion increases the first determination value and the second determination value in accordance with an increase of the acceleration detected by the acceleration detection device.

9. The seat load determining apparatus according to claim 2, wherein the seat corresponds to a passenger seat; further comprises an airbag control portion which allows a deployment of an airbag provided at a forward position of the passenger seat when the determining portion determines that the load applying body on the passenger seat corresponds to the adult at a vehicle collision, and prohibits the deployment of the airbag when the determining portion determines that the load applying body on the passenger seat corresponds to the child seated in the child safety seat at the vehicle collision.

10. The seat load determining apparatus according to claim 1, wherein the vehicle start detection sensor includes a vehicle start presuming portion which determines that the vehicle starts moving based on a temporal increment rate of the detected load value.

11. The seat load determining apparatus according to claim 10, further comprising:
an acceleration detection device which detects an acceleration when the vehicle starts moving; and wherein the determining portion increases the first determination value and the second determination value in accordance with an increase of the acceleration detected by the acceleration detection device.

12. The seat load determining apparatus according to claim 10, wherein the seat corresponds to a passenger seat; further comprises an airbag control portion which allows a deployment of an airbag provided at a forward position of the passenger seat when the determining portion determines that the load applying body on the passenger seat corresponds to the adult at a vehicle collision, and prohibits the deployment of the airbag when the determining portion determines that the load applying body on the passenger seat corresponds to the child seated in the child safety seat at the vehicle collision.

13. The seat load determining apparatus according to claim 1, further comprising:
an acceleration detection device which detects an acceleration when the vehicle starts moving; and wherein the determining portion increases the first determination value and the second determination value in accordance with an increase of the acceleration detected by the acceleration detection device.

14. The seat load determining apparatus according to claim 13, wherein the seat corresponds to a passenger seat; further comprises an airbag control portion which allows a deployment of an airbag provided at a forward position of the passenger seat when the determining portion determines that the load applying body on the passenger seat corresponds to the adult at a vehicle collision, and prohibits the deployment of the airbag when the determining portion determines that the load applying body on the passenger seat corresponds to the child seated in the child safety seat at the vehicle collision.

15. The seat load determining apparatus according to claim 1, wherein the seat corresponds to a passenger seat; further comprises an airbag control portion which allows a deployment of an airbag provided at a forward position of the passenger seat when the determining portion determines that the load applying body on the passenger seat corresponds to the adult at a vehicle collision, and prohibits the deployment of the airbag when the determining portion determines that the load applying body on the passenger seat corresponds to the child seated in the child safety seat at the vehicle collision.

16. A seat load determining apparatus for a vehicle seat possessing a seat back and a rear support portion positioned at a rear of the seat, the seat load determining apparatus comprising:
a load sensor positioned on the rear support portion and configured to output a load signal in response to a load applied to the rear support portion by a body resting on the seat;
a load detection portion configured to receive the load signal, detect a portion of a weight of the body resting on the seat based on the load signal, and output a detected load value;
a vehicle start detection sensor configured to detect that the vehicle starts moving after having been stopped;
a determining portion configured to receive the detected load value and information about whether the vehicle has started moving, and determine whether the body is an adult sitting in the seat or a child seated in a child safety seat fixed to the seat;
the determining portion being configured to determine that the adult is seated in the seat when the detected load value is greater than a first determination value within a predetermined time after the vehicle start detection sensor detects that the vehicle starts moving;
the determining portion being configured to determine that the child seated in the child safety seat is fixed to the seat when the detected load value is smaller than the first determination value and greater than a second determination value within the predetermined time after the vehicle start detection sensor detects that the vehicle starts moving, wherein the second determination value is smaller than the first determination value;
the determining portion being configured to determine that the adult is seated in the seat when the detected load value is greater than a third determination value and the vehicle start detection sensor detects that the vehicle is stopped;
the determining portion being configured to determine that the child is seated in the child safety seat fixed to the seat when the detected load value is smaller than the third determination value and greater than a fourth determination value and the vehicle start detection sensor detects that the vehicle is stopped;
wherein the first determination value is greater than the third determination value by an amount that takes into account an increase in load applied to the seat by the adult as the vehicle accelerates; and
wherein the second determination value is greater than the fourth determination value by an amount that takes into account an increase in load applied to the seat by the child seated in the child safety seat fixed to the seat as the vehicle accelerates.

* * * * *